United States Patent Office 3,186,739
Patented June 1, 1965

3,186,739
FLEXIBLE COUPLING
George A. Mahoff and Leonard L. Rice, Santa Monica, Calif., assignors to Gamah Corporation, a corporation of California
Filed Nov. 14, 1960, Ser. No. 68,725
6 Claims. (Cl. 285—95)

This is a continuation-in-part of application Serial No. 730,305, filed April 23, 1958 and now abandoned.

This invention generally relates to a coupling or connector for joining together opposing tubular members, and more particularly concerns a flexible coupling which will permit not only relative, rotary and axial movement between the tubular members, but which will also permit relative angular movement between the two tubular members. An important feature of the present invention is to maintain a substantially constant sealing force in the coupling despite the rotary, axial or angular flexure between the tubular members. The improved coupling of the present invention is also adaptable to an appreciably wide range of environmental conditions characterized by unusual temperature and pressure characteristics.

Although the improved flexible coupling of the present invention is believed to have primary utility in conjunction with flexible connections between tubular members, it will be appreciated that certain of the inventive elements thereof may equally well be adapted to other applications in which a first member must be sealed to a second member, and yet under conditions in which the first member must be susceptible of limited movement in any direction relative to the second member.

Although the aforementioned application embodies certain basic principles common to the subject matter of the present application, the improved flexible coupling to be hereafter described sets forth certain significant structural features enabling the coupling of the present invention to out-perform most present day, conventional couplings taking into consideration the problems heretofore mentioned.

An object, therefore, of the present invention is to provide an improved flexible coupling that will enable relative axial, rotary, and angular mis-alignment between opposing tubular members.

Another object of the present invention is to provide an improved flexible coupling conforming with the aforegoing object which will, in addition, maintain a proper range of compression of the sealing member during such axial, rotary, or angular mis-alignment, regardless of the position of the sealing member within its cavity.

Still another object of the present invention is to provide an improved flexible coupling which will maintain a constant sealing force despite mis-alignment between the opposing tubular members it couples and despite conditions under which the coupling may be subject either to relatively high pressure or low pressure forces.

Still a further object of the present invention is to provide an improved flexible coupling embodying novel means of attachment of the coupling to the tubular members such that the strength of the resulting joint will equal or exceed the burst value of the tubing involved, and yet in which the joint will provide a maximum degree of resistance to fatigue failure and substantially prevent any possibility of leakage therethrough.

These and other objects and advantages of the present invention are generally attained by providing in a flexible coupling designed for connecting together opposing end portions of tubular members, a pair of opposing flanges rigidly secured, respectively, to the tubular members. Each of the flanges includes a first axially inner annular wall portion and a second axially outer annular wall portion spaced from the inner wall portion. The spaced wall portions define therebetween an O-ring groove. Each of the inner wall portions has an outer peripheral edge sloping angularly inwardly towards a decreased diameter; conversely, each of the outer wall portions has an outer peripheral edge sloping angularly outwardly towards a decreased diameter. An O-ring is positioned in each of the grooves, and means are provided co-functioning to couple the flanges and seal with the O-rings.

In a preferred embodiment, each of the flanges is provided with a plurality of axially spaced annular grooves on its inner diameter side walls, whereby the connecting tubular member may be expanded outwardly with sufficient force to cause the flow of metal into the grooves of the encircling flange to produce mechanical interlocking and form a structurally secure and fluid sealing joint. As an important feature of this particular element of the invention, at least one of the grooves at the outer end of the flange is narrower than the nominal width of the grooves throughout the flange.

A better understanding of the invention will be had by reference to the drawings, showing merely an illustrative embodiment, and in which.

Figure 1:
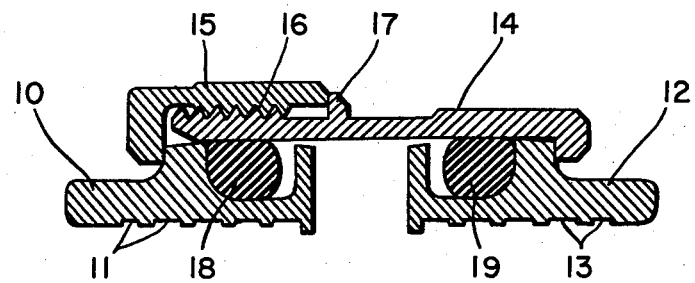
FIGURE 1 is a sectional view through a part of the improved flexible coupling of the present invention.

Referring now to the drawings, there is shown in FIGURE 1 an improved flexible coupling, according to the present invention, embodying a pair of opposing flanges designed for connection to two relatively rigid opposing tubular members. One of the flanges is indicated generally by the numeral 10 and includes a plurality of spaced annular grooves 11 on its inner side walls. The opposing flange is indicated by the numeral 12 and similarly includes a plurality of spaced annular grooves 13 on its inner side walls.

A sleeve member 14 is designed to be received over the flanges 10 and 12 and coupled thereto by a nut 15. The nut 15 is threadedly secured at 16 to the sleeve member 14. Preferably, an annular stop member 17 projects outwardly from the sleeve member 14 to act as a gauge limiting threading of the nut 15 upon the sleeve member 14 to a pre-determined visual position indicating proper assembly of the coupling.

Each of the flanges 10 and 12 is provided with an O-ring acting as a means of sealing the flanges against the sleeve member 14. Thus, the flange 10 has embodied therein an O-ring 18; similarly, the flange 12 has embodied therein an O-ring 19.

Since each of the flanges 10 and 12 is identical in construction, a further detailed description of flange 10 will suffice as a description of both flanges.

Figure 2:
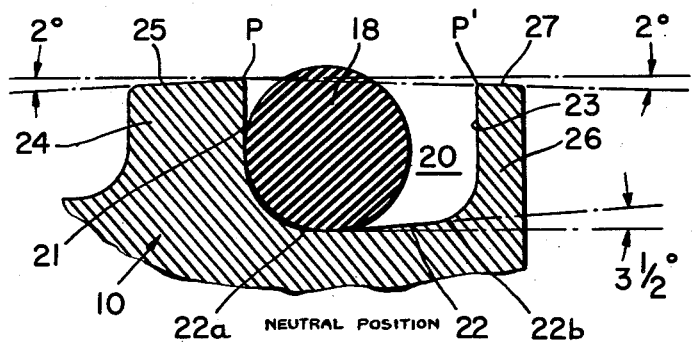
FIGURE 2 is an enlarged sectional view through the upper portion of the flange of the coupling of FIGURE 1, illustrating the flange in an aligned or neutral position.

Referring now to the view of FIGURE 2, the flange 10 defines an annular groove 20 accommodating the O-ring or seal 18. The groove 20, more particularly, is defined by sidewall 21, a bottom wall 22, and opposing sidewall 23. The inner sidewall 21 forms a part of an outer wall portion 24, which terminates in a peripheral edge 25.

The peripheral edge 25 of the wall portion 24 slopes from its axially innermost point "P" to a decreased diameter at its outermost point. The degree of slope is proportional to the degree of angular misalignment required. For purposes of illustration, a slope of two degrees has been shown.

Similarly, but conversely, the inner sidewall 23 forms a part of an inner, annular wall portion 26 defining an outer peripheral edge 27. The peripheral edge 27 of the inner annular wall portion 26 slopes from a point P' to a decreased diameter at its innermost point. Again, the degree of slope has been illustrated as approximately two degrees.

In this regard, it should additionally be noted that the two-degree slope of the edge 27 is determined relative to the point P such that not only the angle of the edge 27 but also its diameter is determined by a two-degree angle extending from the point P.

As a further feature of the improved construction of the O-ring groove, the bottom wall 22 is also sloped, preferably at an angle of approximately three and one-half degrees, towards an outer decreased diameter. The purpose of the slopes characterizing the edges 25, 27, and the bottom wall 22 will be more clearly appreciated as the specification proceeds in an explanation of the operation of the improved flexible coupling of the present invention.

Normally, when the tubular members to which the flanges 10 and 12 are connected are in alignment, the flanges 10 and 12 will be disposed in a neutral position as indicated, for example, by the position of flange 10 in FIGURE 2. In such position, the lowermost point of the bottom wall 22, as indicated at 22a, would be equivalent to the normal diameter of a conventional O-ring groove employed with an O-ring of a given cross section and diameter. It will be appreciated that the O-ring 18 would usually be positioned as indicated in FIGURE 2 assuming normal pressure conditions in the tubular members to which the coupling is connected.

Figure 3:
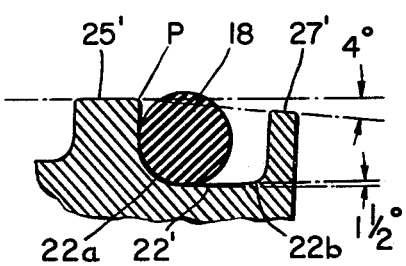
FIGURE 3 is a view of the flange of FIGURE 2 in an angularly canted position, clockwise relative to the neutral position of FIGURE 2.

In one form of angular mis-alignment between the opposing tubular members, the flange 10 would pivot to the position indicated in FIGURE 3, that is, a two degree clockwise rotation about the pivot point "P" would be effected. In such event, the edge 25 would assume the position of 25' as indicated in FIGURE 3, and the edge 27 would assume the position of 27' as indicated in FIGURE 3. Thus, in such position, the edge 27' would be at approximately four degrees with respect to the horizontal. Also, the bottom wall 22 would assume the position indicated at 22' or approximately one and one-half degrees relative to the horizontal. It will be appreciated that in this position, the O-ring 18, assuming that it is still disposed adjacent the decreased diameter portion 22a of the bottom wall 22, will retain substantially its initial compression as in the neutral position of FIGURE 2. In other words, the point 22a of the bottom wall 22 in view of its location directly below the pivot point "P," will have been subjected to only insignificant movement in a radial direction such that its diameter relative to the nominal axis of the tubular members will be maintained substantially constant.

On the other hand, if low pressure or vacuum conditions should occur in the tubular member or for any other reason the O-ring 18 should be shifted towards the portion 22b of the bottom wall 22, it will be evident that the O-ring 18 will only be further compressed because of the one and one-half degree slope still existing. In other words, since the slope of the bottom wall 22 is upwardly and inwardly from 22a to 22b, it is apparent that the O-ring even if it shifts over to the portion 22b will still be maintained under substantially the same or greater compression.

Figure 4:
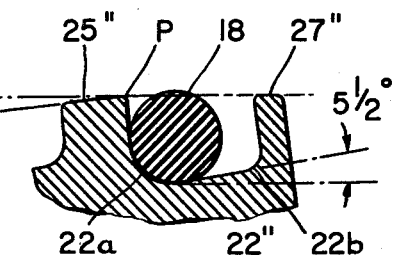
FIGURE 4 is a sectional view of the flange of FIGURE 2 in an angularly canted position, counterclockwise relative to the neutral position of FIGURE 2; and, FIGURE 5 is a sectional view, somewhat enlarged, of the inner grooves of one of the flanges of FIGURE 1 in its co-functioning relationship to the coupled tubular member.

On the other hand, in the event the flange 10 is pivoted in a counterclockwise direction relative to the pivot point "P," such that the edge 27 assumes the position of 27" and such that the edge 25 assumes the position of 25", as indicated in FIGURE 4, the O-ring 18 will still retain substantially its original compression.

Again, the degree of movement of the point or portion 22a of the bottom wall 22 below the pivot point "P" will be such that substantially no change in the diameter of the portion 22a will occur. On the other hand, if the O-ring 18 shifts towards the portion 22b of the bottom wall 22 in its position of 22", only further compression of the O-ring 18 will be effected.

In other words, with the aforegoing described construction, no decrease in compression of the O-ring 18 will occur regardless of angular mis-alignment, although some increase in compression could occur assuming that the O-ring 18 were to be shifted over to the portion 22b of the bottom wall 22.

Thus, by providing the slopes, as indicated, to the edges 25 and 27, the flange 10 is permitted to cant itself in either direction about the pivot point "P" to compensate for angular mis-alignment between tubular members to which the flanges 10 and 12 are coupled. Furthermore, by providing a slope to the bottom wall 22, as indicated, the canting of the flange 10 in either the clockwise or counterclockwise direction about the pivot point "P" will still not decrease the original compression of the O-ring 18. Of course, it is desirable towards this end to establish the diameter of the bottom wall 22 at the point 22a to be equivalent to the standard O-ring groove diameter for a given O-ring according to conventional practice.

Figure 5:
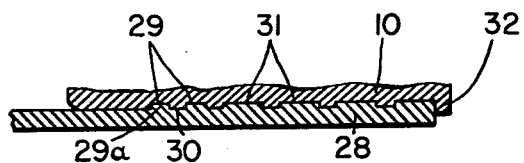

As a further feature of the present invention, a novel method of attaching flanges 10 and 12 to their respective tubular members has been developed. As shown in FIGURE 5, the flange 10 is adapted, for example, to be coupled to the tubular end portion of member 28. A description of flange 10 and its connection to tubular member 28 will suffice for both flanges 10 and 12 since the manner of connection would be identical with respect to flange 12.

The flange 10 is provided with at least one, and preferably two, relatively narrow annular grooves 29 on its inner sidewall and at its outer end. A plurality of lands 30 are partially defined by the grooves 29 and by a further plurality of grooves 31 in the intermediate portion of the flange 10 and towards the inner end thereof.

In a preferred construction, the two outer grooves 29 are approximately 60/1000 of an inch wide while the intermediate and inner grooves 31 are approximately 95 to 100/1000 inch wide. With such a construction, the narrower grooves 29 bring about greater strength to the coupling joint at the outer end thereof so as to prevent fatigue caused by reversals of load direction and to provide a maximum protection against leakage through the joint.

In certain instances, it may only be necessary to have one of the relatively narrow grooves 29, although the configuration as shown in FIGURE 5 is preferred.

It will be appreciated that many changes and modifications may be made in the improved flexible coupling of the present invention by those skilled in the art without departing from the spirit and scope of the invention as set forth in the following claims.

What is claimed is:

1. In a flexible coupling designed for connecting together opposing end portions of two tubular members: a flange rigidly secured to at least one of said end portions including a first radially extending inner annular wall portion, a second radially extending outer annular wall portion spaced from said inner wall portion, and an axially extending wall portion between said first and second wall portions, said wall portions defining an O-ring groove; said inner wall portion having an outer peripheral edge sloping axially inwardly towards a decreased diameter and towards the free end of said tubular member; said outer wall portion having an outer peripheral edge sloping axially outwardly towards a decreased diameter and in a direction opposite the free end of said tubular member; said axially extending wall portion sloping axially outwardly to a decreased diameter from said inner wall portion to said outer wall portion; an O-ring positioned in said groove, said O-ring having a cross-sectional diameter substantially less than the axial dimension between said first and second wall portions and greater than the radial depth of said groove; and, means connecting said opposing end portions, said means including an annular member having a constant diameter cylindrical inner surface portion which bridges said flange and sealingly engages said O-ring.

2. The subject matter, according to claim 1, in which the degree of slope of said axially extending wall portion is greater than the degree of slope of said outer peripheral edge of said inner and outer wall portions.

3. The subject matter, according to claim 1, in which said outer peripheral edge of said outer wall portion slopes axially outwardly from an inner side thereof, said inner side defining the maximum diameter of said flange, and in which said annular member encircles said O-ring to compress said O-ring to said maximum diameter and thereby engage said inner side of said outer wall portion.

4. In a flexible coupling designed for connecting together opposing end portions of two tubular members: a pair of opposing flanges rigidly secured, respectively, to said end portions; each of said flanges including a first radially extending inner annular wall portion, a second radially extending outer annular wall portion spaced from said inner wall portion, and an axially extending wall portion between said first and second wall portions, said wall portions defining an O-ring groove; each said inner wall portion having an outer peripheral edge sloping axially inwardly towards a decreased diameter and towards the free end of said tubular member; each said outer wall portion having an outer peripheral edge sloping axially outwardly towards a decreased diameter and in a direction opposite the free end of said tubular member; said axially extending wall portion sloping axially outwardly to a decreased diameter from said inner wall portion to said outer wall portion; an O-ring positioned in said groove, said O-ring having a cross-sectional diameter substantially less than the axial dimension between said first and second wall portions and greater than the radial depth of said groove; and, means co-functioning to couple said flanges and seal with said O-rings, said means including an annular member having a constant diameter cylindrical inner surface portion which bridges said flanges and sealingly engages said O-rings.

5. The subject matter, according to claim 4, in which the degree of slope of said axially extending portion is greater than the degree of slope of said outer peripheral edge of said inner and outer wall portions.

6. The subject matter, according to claim 4, in which said outer wall portion has an outer peripheral edge sloping from an inner side thereof, said inner side thereof defining the maximum diameter of said flange, and in which said annular member encircles said O-ring to compress same to said maximum diameter and thereby cause said annular member to engage said outer wall portion.

References Cited by the Examiner

UNITED STATES PATENTS

| | | | |
|---|---|---|---|
| 2,092,358 | 9/37 | Robertson | 29—507 |
| 2,252,274 | 8/41 | Rossheim et al. | 285—222 |
| 2,516,743 | 7/50 | Allin | 285—347 |
| 2,521,127 | 9/50 | Price | 285—302 |
| 2,653,040 | 9/53 | Galluppi | 285—347 |
| 2,781,207 | 2/57 | Detweiler et al. | 285—353 |
| 2,792,790 | 5/57 | Capps | 277—177 |
| 3,042,431 | 7/62 | Kryzer | 29—507 |

FOREIGN PATENTS

| | | |
|---|---|---|
| 150,205 | 7/37 | Austria. |
| 186,576 | 7/07 | Germany. |
| 773,540 | 4/57 | Great Britain. |
| 131,649 | 5/29 | Switzerland. |

CARL W. TOMLIN, *Primary Examiner.*